(12) United States Patent
Duchemin et al.

(10) Patent No.: US 10,532,833 B2
(45) Date of Patent: Jan. 14, 2020

(54) SPACE PROPULSION MODULE HAVING BOTH ELECTRIC AND SOLID FUEL CHEMICAL PROPULSION

(71) Applicants: SNECMA, Paris (FR); HERAKLES, Le Haillan (FR)

(72) Inventors: Olivier Bernard Duchemin, Magny les Hameaux (FR); Dominique Indersie, Vernon (FR); Pascal Benoit Caubet, Le Haillan (FR); Pierre Yvart, Ballancourt sur Essonne (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 719 days.

(21) Appl. No.: 14/770,329

(22) PCT Filed: Feb. 26, 2014

(86) PCT No.: PCT/FR2014/050412
§ 371 (c)(1),
(2) Date: Aug. 25, 2015

(87) PCT Pub. No.: WO2014/131990
PCT Pub. Date: Sep. 4, 2014

(65) Prior Publication Data
US 2016/0001898 A1    Jan. 7, 2016

(30) Foreign Application Priority Data
Feb. 26, 2013    (FR) ...................................... 13 51698

(51) Int. Cl.
*B64G 1/40*    (2006.01)
*F02K 9/76*    (2006.01)

(52) U.S. Cl.
CPC ................ *B64G 1/404* (2013.01); *F02K 9/76* (2013.01)

(58) Field of Classification Search
CPC .......... B64G 1/26; B64G 1/405; B64G 1/242; B64G 1/404; F02K 9/08; F02K 9/76;
(Continued)

(56) References Cited

U.S. PATENT DOCUMENTS 3,026,772 A * 3/1962 Moreland ................. F02K 9/18
102/378
5,984,235 A    11/1999 Snowhook
(Continued)

FOREIGN PATENT DOCUMENTS

DE    1506648    *    6/1967
EP    0 665 162 A1    8/1995
(Continued)

OTHER PUBLICATIONS

Farley "Spacecraft Configuration Structural Design Preliminary Design Methods" 2003.*
(Continued)

*Primary Examiner* — Scott J Walthour
*Assistant Examiner* — William L Breazeal
(74) *Attorney, Agent, or Firm* — Oblon, McClelland, Maier & Neustadt, L.L.P.

(57) ABSTRACT

A space propulsion module for fitting to spacecraft is provided. The space propulsion module includes a solid propellant chemical thruster including a main body, and at least one electric thruster. The at least one electric thruster is mounted on main body of the solid propellant chemical thruster.

8 Claims, 2 Drawing Sheets

(58) Field of Classification Search
CPC ........ F03H 1/00; F03H 1/0012; F03H 1/0043; F03H 1/0062; F03H 1/0068; F03H 1/0074; F03H 1/008; F03H 1/0081; F03H 1/0087; F03H 1/0093; F03H 1/0037
See application file for complete search history.

(56) References Cited

U.S. PATENT DOCUMENTS

| | | | | |
|---|---|---|---|---|
| 6,032,904 | A | * | 3/2000 | Hosick .................. B64G 1/26 244/169 |
| 6,186,446 | B1 | | 2/2001 | Tilley et al. |
| 6,206,327 | B1 | * | 3/2001 | Benedetti .............. B64G 1/10 244/159.4 |
| 6,464,174 | B1 | * | 10/2002 | Turner .................. B64G 1/007 244/158.6 |
| 8,584,443 | B1 | * | 11/2013 | Carlson .................. F02K 9/08 60/234 |
| 2003/0062452 | A1 | | 4/2003 | Oh |
| 2005/0109878 | A1 | | 5/2005 | Cruijssen et al. |

FOREIGN PATENT DOCUMENTS

| | | |
|---|---|---|
| EP | 1 059 231 A2 | 12/2000 |
| FR | 2 775 251 A1 | 8/1999 |
| FR | 2 829 104 A1 | 3/2003 |
| FR | 2 980 177 A1 | 3/2013 |
| FR | 2 986 213 A1 | 8/2013 |
| JP | 2000-128094 A | 5/2000 |
| RU | 2 252 332 C2 | 8/2004 |
| RU | 2 271 317 C1 | 3/2006 |
| WO | 99/00300 A1 | 1/1999 |

OTHER PUBLICATIONS

David Y. Oh, et al., "End-to-End Optimization of Chemical-Electric Orbit-Raising Missions", Journal of Spacecraft and Rockets, vol. 41, No. 5, pp. 831-839, (Sep.-Oct. 2004), XP001210184.

International Search Report dated Dec. 4, 2014 in PCT/FR14/050412 Filed Feb. 26, 2014.

"Kocmohabt И ka", Soviet Encyclopedia, Moscow, 1985, p. 432 with cover page (reference previously filed now submitting English translation).

Russian Office Action dated Jan. 29, 2018 in Russian Patent Application No. 2015136970 (submitting English translation only), citing documents AO, AP, and AX therein, 2 pages.

"Kocmohabt И ka", Soviet Encyclopedia, Moscow, 1985, p. 432 with cover page.

* cited by examiner

SPACE PROPULSION MODULE HAVING BOTH ELECTRIC AND SOLID FUEL CHEMICAL PROPULSION

FIELD OF THE INVENTION

The present invention relates to a space propulsion module.

Such a space propulsion module may be fitted to spacecraft such as satellites, probes, or indeed the upper stages of rockets, to mention only some examples. It is useful in particular for performing orbit transfers.

STATE OF THE PRIOR ART

Satellites and other spacecraft are commonly fitted with thrusters enabling them to maneuver in space. In particular, it is common practice for launchers not to take their payloads directly to their nominal operating orbits which are sometimes very far away. Launchers thus release payloads on an elliptical transfer orbit with perigee relatively close to Earth and with apogee situated at the altitude of the operating orbit: under such circumstances, it is the thrusters of the spacecraft that are used to correct its trajectory so that it joins the intended operating orbit.

Such thrusters are commonly liquid propellant chemical thrusters: such chemical thrusters are capable of providing large amounts of acceleration of the order of several g or several tens of g, but they suffer from a specific impulse that is quite low. Specific impulse (Isp) is proportional to the ratio of the thrust from the thruster divided by the mass flow rate of ejected material: it is thus representative in a certain manner of the energy efficiency of the thruster. Space vehicles fitted in this way thus reach their operating orbits quickly but they have to take with them a greater weight of propellant, which significantly increases the cost of launching.

Nevertheless, electric thrusters have been under development for several years: these thrusters produce thrust by accelerating and ejecting charged particles, and in particular ions. Electric thrusters present a specific impulse that is much better, being about five times to ten times greater than that of chemical thrusters. In contrast, they deliver accelerations that are very small, being of the order of $10^{-5}$ g. Spacecraft fitted therewith thus carry less propellant, which makes it possible to put a larger payload into orbit or to reduce launch costs. Nevertheless, the time required for taking up station is much longer, generally being of the order of 8 months to 9 months, and this means that the satellite is put into operation later, which can be a considerable drawback commercially. In addition, since trajectory correction takes place more slowly, the spacecraft passes on numerous occasions and for long periods of time through the Van Allen radiation belt that intersects the transfer orbit: the spacecraft is thus exposed to a high risk of being damaged by radiation, so it requires special shielding.

There therefore exists a real need for a spacecraft of a new type that is provided with propulsion that avoids, at least in part, the drawbacks inherent to the above-mentioned prior art propulsion means.

SUMMARY OF THE INVENTION

The present description relates to a space propulsion module comprising a solid propellant chemical thruster possessing a main body and at least one electric thruster, said at least one electric thruster being mounted on said main body of the solid propellant chemical thruster.

Solid propellant chemical thrusters, also referred to below as solid thrusters, provide a range of thrusts comparable with that of liquid propellant chemical thrusters: they can therefore easily take the place of liquid thrusters for high-thrust type use, in particular as the main thruster of a spacecraft. They are thus advantageously used when maneuvers need to be performed quickly: by way of example, this can apply to a maneuver for leaving an environment that is harmful for the spacecraft, such as that of the Van Allen radiation belt, for example, or else an emergency maneuver.

Furthermore, solid thrusters are less complex and simpler to prepare than corresponding liquid thrusters and they are thus less expensive. In particular, a solid propellant is simpler to store: specifically, it does not require pressurized tanks, feed pipes, on/off or control valves, or a preheater. Nor does it require two propellants to be stored separately, nor does it require a device for mixing them before combustion. In addition to increased simplicity, solid thrusters reduce the weight of on-board equipment and thereby correspondingly increase the available payload weight for the spacecraft, which is another major economical advantage. In addition, the toxicity of solid propellants is generally less than that of liquid propellants, which thus makes them less subject to environmental restrictions.

Electric thrusters provide thrust that is much smaller, but they make a much larger Isp available: they can thus advantageously take the place of chemical thrusters for maneuvers that are constrained little by duration, and for which the spacecraft finds its speed vector changed significantly only at the end of a longer duration.

The propulsion module thus combines the advantages of solid thrusters and of electric thrusters while reducing the impact of their respective defects, taking advantage of the specific features of the various maneuvers that are to be performed.

For example, in the context of orbit transfer maneuvers, such a propulsion module is thus particularly advantageous since it enables either its solid propulsion or its electric propulsion to be used in order to take advantage of strong thrust or on the contrary of a large Isp, depending on its position, e.g. relative to the Van Allen belts, or depending on characteristics of its trajectory. Such a module enables a larger payload to be put onto station, while conserving a transfer duration that is reasonable, with the satellite being put into operation with little or no delay and in general the duration of the transfer does not exceed 2 months to 3 months. Naturally, where appropriate, it is also possible to use solid propulsion and electric propulsion simultaneously.

Finally, such a configuration in which the electric thruster is mounted on the main body of the solid propellant chemical thruster is particularly compact and provides a propulsion module that is easy to integrate, thereby improving its characteristic of being an independent module suitable for being fitted without substantial modification to a wide range of spacecraft that require such a propulsion function.

In certain embodiments, the main body of the solid propellant chemical thruster is made of composite material. Such a category of material makes a significant weight saving possible, thereby enabling a correspondingly larger payload to be carried.

In certain embodiments, the solid propellant chemical thruster comprises a charge of fuel that is stored in the main body, an ejector nozzle, and a power supply and electronic control unit.

In certain embodiments, the ejector nozzle of the solid propellant chemical thruster is steerable. It can thus advantageously be fitted with two electomechanical actuators for controlling trajectory in yaw and in pitching.

In certain embodiments, the electric thruster is mounted on the main body of the solid propellant chemical thruster via a fastener structure comprising a top flange provided at the top end of the main body of the solid propellant chemical thruster, and a bottom flange provided at the bottom end of the main body of the solid propellant chemical thruster. Installing these flanges makes it possible for most of the fastenings to be grouped together in a zone of small size, thereby providing better overall rationalization, and in particular better management of mechanical stresses caused by fastening the electric thruster on the solid thruster. In particular, it is possible to provide these flanges with a structure and/or a shape suitable for withstanding mechanical forces without damaging the main body of the solid thruster, and possibly also suitable for damping vibration.

In certain embodiments, the top flange is a cylindrical flange or hoop mounted on the main body.

In certain embodiments, the top flange is an annular flange mounted on a top skirt of the main body of the solid propellant chemical thruster.

In other embodiments, the top flange is a margin projecting along a top outline of the main body of the solid propellant chemical thruster. Advantageously, it may then be constituted merely by an extra thickness of the side wall of the main body provided along its top edge.

In certain embodiments, the bottom flange is a cylindrical flange mounted as a hoop on the main body. This cylindrical flange can thus be mounted easily, in particular by hoop shrinkage, around the main body without damaging it.

In certain embodiments, the bottom flange is a cylindrical hoop flange mounted on a bottom skirt of the main body.

In other embodiments, the bottom flange is a margin projecting along a bottom outline of the main body of the solid propellant chemical thruster.

In certain embodiments, the electric thruster comprises an electric thruster member and a tank of propulsion fluid. The thruster member may be of any known type, and in particular of the stationary plasma type; the propulsion fluid may be of various kinds and in particular it may be xenon, krypton, argon, or a mixture of these elements.

In certain embodiments, the electric thruster also has a pressure regulator stage provided between the propulsion fluid tank and the electric thruster member.

In certain embodiments, the electric thruster member is fastened to the bottom flange and preferably oriented towards the rear of the module. This position enables the module to be thrust forwards, while reducing any risk of particles coming from the electric thruster member being projected onto the solid thruster.

In certain embodiments, the propulsion fluid tank is fastened between the bottom and top flanges.

In certain embodiments, the module further comprises a steering control system for steering about at least one axis and including at least one gas thruster. Such a control system may serve in particular to stabilize the trajectory in roll. The thruster may equally well make use of cold gas or of hot gas.

In certain embodiments, the gas thruster is fastened to the bottom flange and oriented tangentially to said bottom flange.

In certain embodiments, the gas used for the gas thruster is the same propulsion fluid as is used for the electric thruster and it then comes from the propulsion fluid tank of the electric thruster.

In other embodiments, the gas used for the gas thruster is different from the propulsion fluid and comes from a specific tank. In particular, it may be a nitrogen tank.

In certain embodiments, the top flange is provided with a top mechanical interface suitable for being connected to a spacecraft such as a satellite.

In certain embodiments, the bottom flange is provided with a bottom mechanical interface suitable for being connected to a space launcher.

In certain embodiments, the diameters of the top and bottom mechanical interfaces are identical. Because of these interfaces, the propulsion module can easily be inserted without substantial additional adaptation between a satellite and a launcher when preparing a mission.

In certain embodiments, the electric thruster is mounted on the main body of the solid propellant chemical thruster by means of a frame structure fastened around the solid propellant chemical thruster. Such a structure provides great freedom in fastening the electric thruster and any auxiliary members around the solid thruster, the frame structure possibly being fastened to the main body of the solid thruster at a small number of points in zones that are not sensitive so as to avoid damaging the body. In addition, such a frame structure forming an interface between the electric thruster and the solid thruster provides greater decoupling between the mechanical stresses generated by each thruster. Under such circumstances, it becomes possible to use a preexisting solid thruster without substantial adaptation.

In certain embodiments, the frame structure possesses a frustoconical or cylindrical shape.

In certain embodiments, the electric thruster member is fastened to the inside wall of the frame structure and oriented towards the rear of the module. Arranging the electric thruster member on the inside relative to the frame structure serves firstly to avoid projecting particles against the frame structure and secondly to benefit from more room being available on the outside surface for fastening any auxiliary members.

In certain embodiments, the propulsion fluid tank is fastened to the outside wall of the frame structure. It is preferably fastened tangentially relative to the main direction of the frame, which coincides with the main direction of the module.

In certain embodiments, the gas thruster of the steering control system for steering about at least one axis is fastened to the outside wall of the frame structure and is oriented tangentially relative to the main direction of the module.

In certain embodiments, the frame structure includes a top support portion provided at its top end with a top mechanical interface suitable for connecting to a spacecraft such as a satellite.

In certain embodiments, the frame structure includes a frustoconical bottom adapter portion flaring from the top portion and provided at its bottom end with a bottom chemical interface suitable for being connected to a space launcher. Because of these interfaces, the propulsion module can easily take the place of the diameter transition adapter that is usually needed between the interface of a launcher and the interface of a spacecraft such as a satellite.

In certain embodiments, the propulsion module also has electricity production means, communication means, and navigation means enabling it to function autonomously.

The above-mentioned characteristics and advantages, and others, appear on reading the following detailed description of embodiments of the proposed module. The detailed description refers to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of elements) that are identical are referenced by the same reference signs. Furthermore, elements (or portions of elements) forming parts of different embodiments but having functions that are analogous are referenced in the figures by numerical references that are incremented by 100, 200, etc.

DETAILED DESCRIPTION OF EMBODIMENTS

In order to make the invention more concrete, embodiments of modules are described in detail below, with reference to the accompanying drawings. It should be recalled that the invention is not limited to these embodiments.

Figure 1:
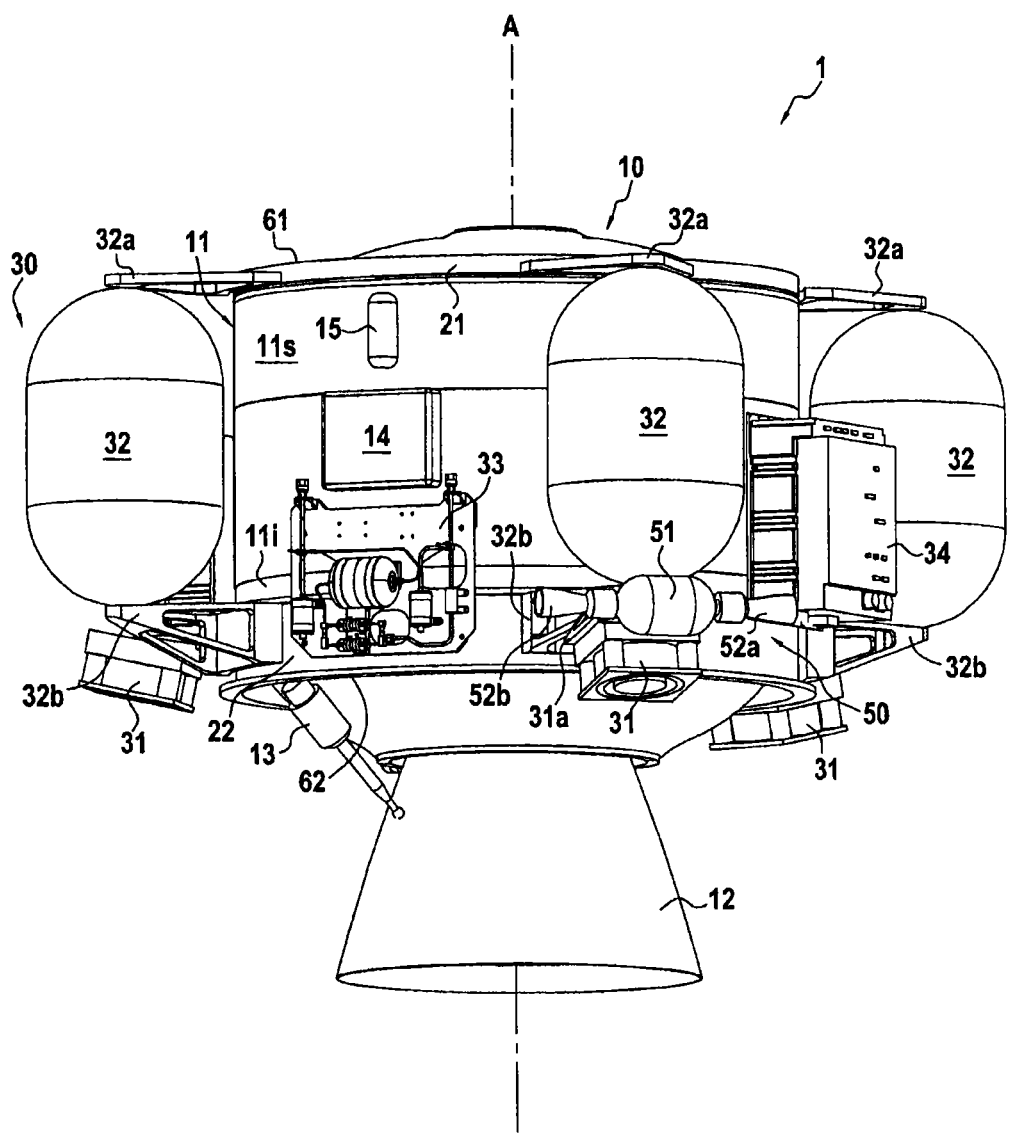
FIG. 1 is a profile view of a first embodiment of a propulsion module.

FIG. 1 shows a first embodiment of a propulsion module 1. It comprises a solid propellant chemical thruster 10 having mounted around it a certain number of members constituting the electric thruster 30 or auxiliary functions.

The solid propellant chemical thruster 10, also referred to as a solid thruster, is generally a body of revolution about a main axis A and comprises a main body 11 enclosing a charge of solid propellant, and a nozzle 12 arranged axially behind the main body 11.

The nozzle 12 is steerable by means of two electromechanical actuators 13 (only one of which is visible in FIG. 1) arranged at 90° relative to each other around the nozzle 12. They thus enable the nozzle to be controlled in order to act on yaw and pitching components of the trajectory of the module 1 and thus of the spacecraft to which it is fitted. In another embodiment, a two-nozzle configuration with each nozzle steered by two electromechanical actuators at 90° could likewise be used for controlling the spacecraft in roll.

These actuators 13 are controlled by an actuator control unit 14 fastened on the side surface of the main body 11. In addition, a battery 15 is also fastened to the side surface of the main body 11 in order to power the system of the propulsion module 1 when it does not benefit from an external electrical power supply, in particular when the solar panels of the spacecraft are not yet deployed.

The main body 11 is preferably made of composite material. In order to limit the number of fastenings formed in the main body 11 made of composite material, and thus avoid damaging it as much as possible, the main body 11 is provided with two fastener interfaces 21 and 22.

The first is a top fastener flange 21 mounted at the top end of the main body 11. This top fastener flange 21 is annular in shape and is a separate fitting, preferably made of aluminum alloy, that is mounted by pegs or by screw fasteners for example on a composite skirt 11s extending the largest diameter portion of the main body 11 upwards.

The second fastener interface is a bottom fastener flange 22 mounted at the bottom end of the main body 11. This bottom fastener flange 22, of annular shape, is thus a separate fitting, preferably made of aluminum alloy, that is mounted by pegs or by screw fasteners for example on a composite skirt 11i extending the largest diameter portion of the main body 11 downwards.

These two fastener flanges 21 and 22 enable the electric thruster 30 to be fastened on the solid thruster 10. The electric thruster 30 comprises a plurality of electric thrust plates 31, a plurality of propulsion fluid tanks 32 feeding the thrust plates 31, a pressure regulator device 33, and a power supply and electronic control unit 34 commonly referred to as a power processing unit (PPU), for each thrust plate 31.

Each electric thrust plate 31 is of the stationary plasma thruster type: it consumes the propulsion fluid that it ionizes and accelerates in the form of a plasma by means of the action of strong electric fields generated by the PPU 34 of the plate 31 under consideration. By reaction, the plasma as ejected in this way from the plate 31 generates thrust that accelerates the module 1. Each plate 31 is mounted on the bottom fastener flange 32 by means of an attachment 31a so that it is directed towards the rear of the module 1. There are preferably three such plates distributed at 120° intervals around the axis A. The direction of the thrust from each thrust plate 31 may form a small angle relative to the direction defined by the axis A: under such circumstances, the thrust directions from the set of thrust plates 31 coincide at a point on the axis A that is preferably situated at the center of gravity of the assembly constituted by the propulsion module and the spacecraft it propels.

The propulsion fluid tank 32 contains the propulsion fluid needed to operate the thrust plates 31; it is preferably xenon. The number of tanks is not necessarily equal to the number of thrust plates 31: in this embodiment, the module 1 thus has four tanks of propulsion fluid 32 (the fourth being masked by the solid thruster 10). Each propulsion fluid tank 32 is fastened at a first end to the top fastener flange 21 by means of a first attachment 32a and at a second end to the bottom fastener flange 22 by means of a second attachment 32b. They are thus arranged so as to be substantially parallel to the axis A and at 90° intervals around the axis A.

The pressure regulator device 33 serves to reduce the pressure of the propulsion fluid before it is fed to the thrust plates 31. In this example, only one such device is provided that is fastened to the bottom fastener flange 22. In addition, it could also be fastened in part to one or two length members having their ends mounted to the two fastener flanges 21 and 22.

Each PPU 34 serves to feed a thrust plate 31 with electricity capable of generating electric fields that are strong enough to enable the thrust plate 31 to operate. Like the pressure regulator device 33, each PPU 34 may be fastened in part to the bottom fastener flange 22 and to the length members interconnecting the two fastener flanges 21 and 22, preferably in the proximity of the thrust plate 31 that it powers.

The module 1 also has a gas thruster 50 comprising a gas tank 51, a first nozzle 52a, and a second nozzle 52b directed along the same axis as and in the opposite direction to the first nozzle 52a. This gas thruster 50 is fastened to the bottom fastener flange 22 in such a manner that the two nozzles 52a and 52b are arranged tangentially relative to the axis A: this thruster is thus capable of acting on the roll component of the trajectory of the module 1.

In this embodiment, the gas thruster is fastened to the bottom fastener flange 22 by means of the attachment 31a of one of the electric thruster plates 31; nevertheless it could equally well have its own attachment.

In this embodiment, the gas thruster 50 uses gas coming from its own tank 51, specifically nitrogen, or hot gas coming from the combustion of a solid propellant block; nevertheless, in other embodiments, the gas thruster 50 could be powered with gas coming from the propulsion fluid tank 32. Under such circumstances, the pressure regulator device 33 performs not only its main function as described above, but may also serve to reduce the pressure of the propulsion fluid to a pressure that is appropriate for the gas thruster 50.

In addition to their above-described functions, the top and bottom fastener flanges 21 and 22 are also configured to present top and bottom mechanical interfaces 61 and 62 complying with the standards and practices that are current in the aerospace field so as to enable the module 1 to be fastened to a spacecraft by means of its top mechanical interface 61, and to a launcher by means of its bottom mechanical interface 62.

In particular, in this embodiment, the diameters of the top and bottom mechanical interfaces 61 and 62 are identical so that the module 1 can be inserted between a spacecraft and a launcher without requiring any additional special adapter.

Figure 2A:
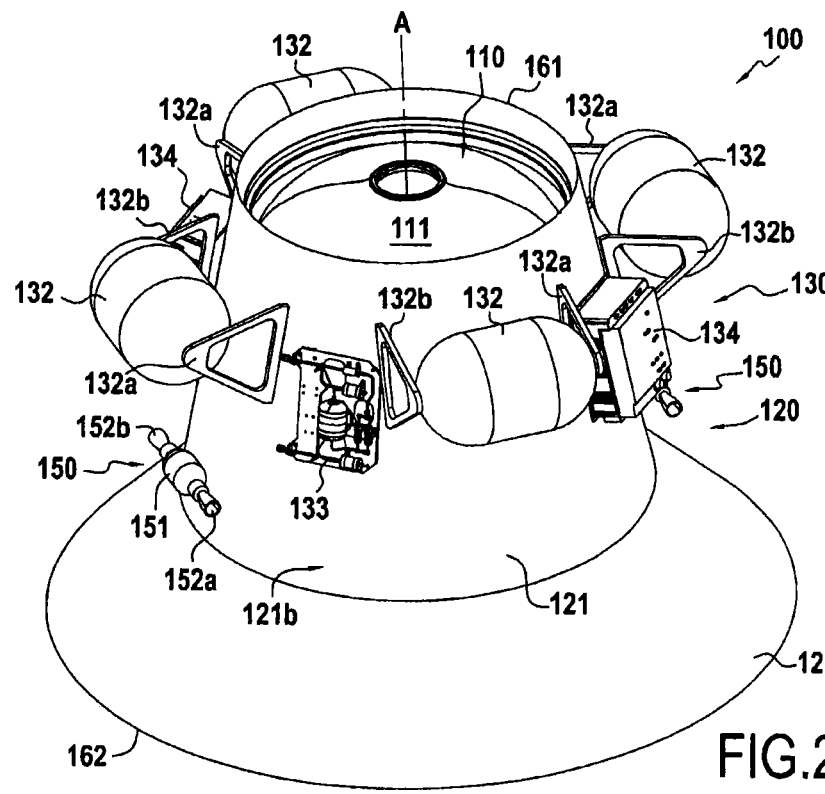
FIG. 2A is a perspective view of a second embodiment of a propulsion module.
Figure 2B:
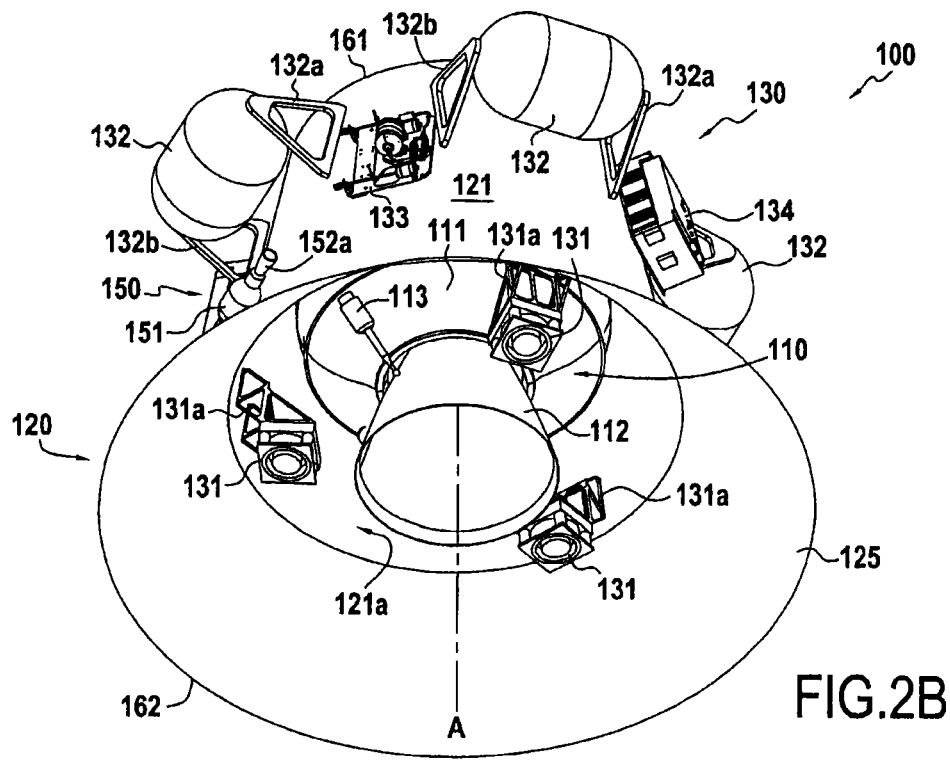
FIG. 2B is a view of the FIG. 2A embodiment seen looking in the opposite direction.

FIGS. 2A and 2B show a second embodiment of a propulsion module 100. It comprises a solid propellant chemical thruster 110 having mounted therearound a frame structure 120 on which there are fastened various members constituting the electric thruster 130 or auxiliary functions.

The solid propellant chemical thruster 110, also referred to as a solid thruster, is generally identical to the thruster 10 of the first embodiment, and is therefore not described again in detail.

In order to limit the number of fastenings formed in the main body 111, which is preferably made of composite material, and thus avoid as much as possible damaging the main body 111, it is provided with the frame structure 120.

This frame structure 120, which is preferably made of aluminum and carbon fiber reinforced polymer (CFRP) composite, may be mounted around the main body 111 by any known fastener means, by pegs or by screw fasteners, for example.

This frame structure 120, has a top support portion 121 of frustoconical shape that flares towards the rear of the module 100, and that serves to fasten the electric thruster 130 on the solid thruster 110. The electric thruster 130 generally comprises the same members as the electric thruster 30 of the first embodiment: a plurality of electric thrust plates 131, a plurality of propulsion fluid tanks 132 feeding the thrust plates 131, a pressure regulator device 133, and a PPU 134 for each thrust plate 131.

Each plate 131 is mounted on the inside face 121a of the support portion 121 of the frame structure 120 via an attachment 131a so as to be directed towards the rear of the module 1. In this example, likewise, there are preferably three of them distributed at 120° intervals around the axis A.

Each propulsion fluid tank 132 is fastened to the outside face 121b of the support portion 121 by means of a first attachment 132a and a second attachment 132b provided respectively at a first end and at a second end of the tank 132. In this embodiment, the tanks 132 are arranged in a plane substantially orthogonal to the axis A and they are at 90° intervals around the axis A.

In this example, only one regulator device 133 is provided, and it is fastened to the outside face 121b of the support portion 121.

Each PPU 134 is also fastened to the outside face 121b of the support portion 121, preferably in the proximity of the thrust plate 131 that it powers.

The module 100 also has two gas thrusters 150 that are generally identical to the gas thruster 50 of the first embodiment, having a gas tank 151, a first nozzle 152a, and a second nozzle 152b that is directed along the same axis as and in the opposite direction to the first nozzle 152a. Each gas thruster 150 is fastened to the outside face 121b of the support portion 121 so that its two nozzles 152a, 152b are arranged tangentially relative to the axis A. In addition, each gas thruster 150 is arranged at the bottom end of the support portion 121 so as to benefit from a large distance from the axis A, thereby providing it with a large lever arm for acting on the roll component of the trajectory of the module.

Furthermore, in addition to the above-described functions, the frame structure 120 is also configured to present top and bottom mechanical interfaces 161 and 162 in compliance with the standards and practices that are current in the aerospace field so as to enable the module 100 to be fastened to a spacecraft by means of its top mechanical interface 161 and to a launcher by means of its bottom mechanical interface 162. Thus, the top end of the frame structure 120 is configured to form the top mechanical interface 161, while the frame structure 120 includes in line therewith and behind its top support portion 121, a bottom adapter portion 125 of substantially frustoconical shape (which may nevertheless present an angle that is different from that of the support portion 121), with its bottom end configured to form the bottom mechanical interface 162.

By means of this adapter portion 125, it is possible to adjust the diameter of the bottom mechanical interface 162 in such a manner as to make it correspond to the standard diameter of the launcher interface: under such circumstances, since the diameter of the top mechanical interface 161 is adapted to the interface with the spacecraft, the module 100 can take the place of a diameter transition adapter as is usually needed between the interfaces of a launcher and of a spacecraft such as a satellite.

The embodiments described in the present description are given by way of non-limiting illustration, and in the light of this description, a person skilled in the art can easily modify these embodiments or envisage others, while remaining within the score of the invention.

Furthermore, the various characteristics of these embodiments may be used on their own or they may be combined with one another. When they are combined, these characteristics may be combined as described above or in other ways, the invention not being limited to the specific combinations described in the present description. In particular, and unless specified to the contrary, a characteristic that is described with reference to any one embodiment may be applied in analogous manner to any other embodiment.

The invention claimed is:

1. A space propulsion module, comprising: a solid propellant chemical thruster possessing a main body; and an electric thruster, wherein the electric thruster is mounted on said main body of the solid propellant chemical thruster, wherein the electric thruster is mounted on the main body of the solid propellant chemical thruster via a fastener structure including a top flange provided at a top end of the main body of the solid propellant chemical thruster, and a bottom flange provided at a bottom end of the main body of the solid propellant chemical thruster, wherein the top flange is an annular flange mounted on a top skirt of the main body of the solid propellant chemical thruster, and the bottom flange is a cylindrical flange mounted on a bottom skirt of the main body, wherein the electric thruster comprises an electric thrust plate, a tank of propulsion fluid, and a power processing unit for the electric thrust plate, wherein the electric thrust plate is a stationary plasma thruster plate and is mounted to the bottom flange so as to be directed toward a rear of the space propulsion module, wherein the tank of propulsion fluid is fastened to the bottom flange at a first end of the propulsion fluid tank and is fastened to the top flange at a second end of the propulsion fluid tank, and wherein the power processing unit feeds electricity for generating an electric field to operate the electric thrust plate, and the power processing unit being fastened in part to the bottom flange.

2. The space propulsion module according to claim 1, wherein the main body of the solid propellant chemical thruster is made of composite material.

3. The space propulsion module according to claim 1, further comprising a steering control system for steering about at least one axis and including at least one gas thruster, and wherein said at least one gas thruster is fastened to the bottom flange and oriented tangentially to said bottom flange.

4. The space propulsion module according to claim wherein the top flange is provided with a top mechanical interface suitable for being connected to a spacecraft, and wherein the bottom flange is provided with a bottom mechanical interface suitable for being connected to a space launcher.

5. A space propulsion module, comprising: a solid propellant chemical thruster possessing a main body; and an electric thruster, wherein the electric thruster is mounted on said main body of the solid propellant chemical thruster, wherein the electric thruster is mounted on the main body of the solid propellant chemical thruster by a frustoconical or cylindrical frame structure fastened around the solid propellant chemical thruster, wherein the electric thruster comprises an electric thrust plate, a tank of propulsion fluid, and a power processing unit for the electric thrust plate, wherein the power processing unit feeds electricity for generating an electric field to operate the electric thrust plate, wherein the electric thrust plate is a stationary plasma thruster plate and is directed toward a rear of the space propulsion module, wherein the electric thrust plate is fastened to an inside wall of the frustoconical or cylindrical frame structure, and wherein the propulsion fluid tank and the power processing unit are fastened to an outside wall of the frustoconical or cylindrical frame structure.

6. The space propulsion module according to claim 5, further comprising a steering control system for steering about at least one axis and including at least one gas thruster, wherein said at least one gas thruster is fastened to the outside wall of the frustoconical or cylindrical frame structure and oriented tangentially relative to a main direction of the space propulsion module.

7. The space propulsion module according to claim 5, wherein the frustoconical or cylindrical frame structure includes a top support portion provided at a top end of the frustoconical or cylindrical frame structure with a top mechanical interface suitable for connecting to a spacecraft, and a frustoconical bottom adapter portion flaring from the top support portion and provided at a bottom end of the frustoconical bottom adapter portion with a bottom mechanical interface suitable for being connected to a space launcher.

8. A space propulsion module, comprising: a solid propellant chemical thruster possessing a main body; and an electric thruster, wherein the electric thruster is mounted on said main body of the solid propellant chemical thruster, wherein the electric thruster is mounted on the main body of the solid propellant chemical thruster by a frustoconical or cylindrical frame structure fastened around the solid propellant chemical thruster, wherein the electric thruster comprises an electric thruster member and a propulsion fluid tank, wherein the electric thruster member is fastened to an inside wall of the frustoconical or cylindrical frame structure, and wherein the propulsion fluid tank is fastened to an outside wall of the frustoconical or cylindrical frame structure.

* * * * *